(12) United States Patent
Sakaki et al.

(10) Patent No.: US 8,809,450 B2
(45) Date of Patent: Aug. 19, 2014

(54) MODIFIED NATURAL RUBBER, PRODUCTION METHOD THEREOF, TIRE RUBBER COMPOSITION, AND PNEUMATIC TIRE

(75) Inventors: Toshiaki Sakaki, Kobe (JP); Naoya Ichikawa, Kobe (JP); Masako Iwamoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/350,407

(22) Filed: Jan. 13, 2012

(65) Prior Publication Data

US 2012/0184671 A1  Jul. 19, 2012

(30) Foreign Application Priority Data

Jan. 17, 2011  (JP) ................. 2011-007357

(51) Int. Cl.
- *C08C 3/00* (2006.01)
- *C08K 3/04* (2006.01)
- *C08C 1/14* (2006.01)
- *C08L 7/00* (2006.01)

(52) U.S. Cl.
USPC ....................................... 524/572; 525/333.1

(58) Field of Classification Search
USPC ........................................ 524/572; 525/333.1
See application file for complete search history.

(56) References Cited

U.S. PATENT DOCUMENTS

2006/0252879 A1*  11/2006  Tanaka et al. ................. 524/571

FOREIGN PATENT DOCUMENTS

| JP | 3294901 B2 | 6/2002 |
|----|------------|--------|
| JP | 2010-138359 A | 6/2010 |
| JP | 2010-174169 A | 8/2010 |

* cited by examiner

*Primary Examiner* — Ling Choi
*Assistant Examiner* — Catherine S Branch
(74) *Attorney, Agent, or Firm* — Birch, Stewart, Kolasch & Birch, LLP

(57) ABSTRACT

The present invention provides a modified natural rubber which simultaneously achieves good fuel economy and good heat-aging resistance, and the production method thereof. The present invention also provides a tire rubber composition and a pneumatic tire which are produced using the modified natural rubber. The present invention relates to a modified natural rubber which is obtainable by treating a rubber coagulated from a saponified natural rubber latex, with a basic compound and then with an acidic compound.

9 Claims, No Drawings

MODIFIED NATURAL RUBBER, PRODUCTION METHOD THEREOF, TIRE RUBBER COMPOSITION, AND PNEUMATIC TIRE

TECHNICAL FIELD

The present invention relates to a modified natural rubber, a method for producing the modified natural rubber, a tire rubber composition produced using the modified natural rubber, and a pneumatic tire produced using the rubber composition.

BACKGROUND ART

In conventional vehicles, fuel consumption is reduced by reducing the rolling resistance of tires to suppress heat build-up. A demand for lower fuel consumption of vehicles owing to tires is becoming increasingly greater, and thus further studies are essential for improving fuel economy. Natural rubber generally used in tires has been considered to have better fuel economy than styrene-butadiene rubber; however, styrene-butadiene rubber is now being improved to give lower fuel consumption. Therefore, natural rubber is also required to give much lower fuel consumption in order to achieve good fuel economy of the tire as a whole.

In order to improve natural rubber in terms of fuel economy, modification of natural rubber has been proposed. For example, Patent Document 1 discloses a modification method in which a natural rubber latex is mixed with a surfactant and then washed. In this method, however, proteins and a gel fraction are removed to some extent but still in an insufficient level; further reduction in tan δ is desired. In addition, tires are also required to have properties such as heat-aging resistance; however, no documents teach simultaneous achievement of good fuel economy and good heat-aging resistance.

Patent Document 1: JP 3294901 B

SUMMARY OF THE INVENTION

The present invention aims to provide a modified natural rubber which is capable of solving the above problems and of simultaneously achieving good fuel economy and good heat-aging resistance, and the production method thereof. In addition, the present invention aims to provide a tire rubber composition produced using the modified natural rubber and a pneumatic tire produced using the tire rubber composition.

The present invention relates to a modified natural rubber obtainable by treating a rubber coagulated from a saponified natural rubber latex, with a basic compound and then with an acidic compound.

The basic compound is preferably a basic inorganic compound. The basic inorganic compound is preferably at least one selected from the group consisting of metal hydroxides, metal carbonates, metal hydrogen carbonates, metal phosphates and ammonia.

The coagulated rubber is preferably treated with the basic compound for 1 minute to 48 hours.

The modified natural rubber preferably has a nitrogen content of 0.15% by mass or less after immersed in acetone at room temperature for 48 hours. Also, the modified natural rubber preferably has a phosphorus content of 200 ppm or less.

The present invention also relates to a method for producing the modified natural rubber, comprising: Step 1 in which a natural rubber latex is saponified; Step 2 in which the saponified natural rubber latex obtained in Step 1 is coagulated and the resulting coagulated rubber is treated with a basic compound; and Step 3 in which the treated rubber is treated with an acidic compound.

The present invention further relates to a tire rubber composition comprising: a rubber component; and carbon black and/or a white filler, wherein the composition contains the modified natural rubber in an amount of 5% by mass or more based on 100% by mass of the rubber component.

The present invention furthermore relates to a pneumatic tire produced using the rubber composition.

Since the present invention relates to a modified natural rubber which is obtainable by treating a rubber coagulated from a saponified natural rubber latex, first with a basic compound and then with an acidic compound, proteins and phospholipids in rubber can be sufficiently removed, and the fuel economy can be improved. In addition, the modified natural rubber is less likely to suffer reduction in the molecular weight during storage, and then it has heat-aging resistance equivalent to that of usual natural rubber (non-modified). Therefore, the present invention can provide a tire rubber composition and pneumatic tire excellent in fuel economy and heat-aging resistance.

BEST MODE FOR CARRYING OUT THE INVENTION

[Modified Natural Rubber]

The modified natural rubber of the present invention is obtainable by treating a rubber coagulated from a saponified natural rubber latex, with a basic compound and then with an acidic compound.

In the case that a natural rubber latex is saponified so as to improve natural rubber in terms of fuel economy, proteins and phospholipids decomposed during the saponifying step are trapped in the rubber or remain on the rubber surface in a state of being strongly adsorbed thereon upon rubber coagulation; these components are not sufficiently removed by washing with water or the like. In contrast, in the present invention, a rubber coagulated from a saponified natural rubber latex is first treated with a basic compound, and thereby residual components such as proteins can be sufficiently removed. Thus, the modified natural rubber of the present invention is capable of further improving fuel economy. These steps have some problems such as that natural antioxidant components including proteins are removed due to the saponification, and the heat-aging resistance is reduced due to the treatment with a basic compound; however, further treatment with an acidic compound can solve such problems and provide good heat-aging resistance.

Furthermore, treatment with a basic compound may disadvantageously cause premature vulcanization or rubber scorch; however, the treatment with an acidic compound can eliminate this concern, and a curing rate similar to that in the case of non-modified natural rubber can be achieved. In addition, treatment with an acidic compound may disadvantageously cause reduction in crosslinking density; however, such reduction can be suppressed in the present invention.

Specifically, the modified natural rubber of the present invention can be prepared, for example, by a production method comprising: Step 1 in which a natural rubber latex is saponified; Step 2 in which the saponified natural rubber latex obtained in Step 1 is coagulated and the resulting coagulated rubber is treated with a basic compound; and Step 3 in which the base-treated rubber is treated with an acidic compound.

(Step 1)

In Step 1, a natural rubber latex is saponified. Thereby, phospholipids and proteins are decomposed.

Natural rubber latex is taken as sap of natural rubber trees such as hevea trees, and contains components including water, proteins, lipids, inorganic salts as well as a rubber component. The gel fraction in rubber is considered to be derived from a complex of various impurities in rubber. In the present invention, the natural rubber latex to be used may be raw latex (field latex) taken from hevea trees by tapping, or may be concentrated latex (e.g. purified latex; high-ammonia latex in which ammonia is added to latex by a usual method; and LATZ latex which is stabilized with zinc oxide, TMTD, and ammonia) concentrated by centrifugation or creaming, for example.

The saponification may be suitably performed by the method disclosed in JP 2010-138359 A or JP 2010-174169 A, for example, and specifically may be performed by the following method, for example.

The saponification is achieved by still standing of a natural rubber latex mixed with an alkali and, if necessary, a surfactant for a certain period of time at a predetermined temperature. If necessary, stirring or the like operation may be performed.

Preferable examples of the alkali to be used in the saponification include sodium hydroxide and potassium hydroxide. The surfactant is not particularly limited, and examples thereof include conventional nonionic surfactants, anionic surfactants, and amphoteric surfactants such as polyoxyethylene alkyl ether sulfates. Preferable are polyoxyethylene alkyl ether sulfates because they enable good saponification without rubber coagulation. In the saponification, the amounts of an alkali and a surfactant, and the temperature and duration of the saponification may be appropriately adjusted.

In the saponification step, an antioxidant may be added before, during, or after the saponification as appropriate. The antioxidant is preferably in the form of a dispersion of an antioxidant. For example, an antioxidant dispersion containing an antioxidant, a surfactant, and water (a dispersion in which an antioxidant is uniformly dispersed in water) may be used. Use of such a dispersion causes the antioxidant to be absorbed into (adsorbed on) rubber particles, and thereby good fuel economy and heat-aging resistance are achieved.

In the case of adding an antioxidant dispersion before the saponification, the saponification is performed after the antioxidant is mixed with a natural rubber latex; in the case of adding it during the saponification, the antioxidant is mixed with a natural rubber latex, an alkali, and/or another agent; and in the case of adding it after the saponification, the antioxidant is mixed with a saponified natural rubber latex obtained by the saponification.

In the antioxidant dispersion, the antioxidant is not particularly limited. Phenolic antioxidants are preferable because they are easy to use. Examples of the phenolic antioxidant include 2,2'-methylenebis-(4-methyl-6-tert-butylphenol) (Nocrac NS-6, Ouchi Shinko Chemical Industrial Co., Ltd.), 2,6-di-tert-butyl-4-methylphenol (Nocrac 200, Ouchi Shinko Chemical Industrial Co., Ltd.), and 2,2'-methylene-bis-(4-ethyl-6-tert-butylphenol) (YOSHINOX 425, API Corporation), and hindered phenolic antioxidants such as a compound obtained by butylating a condensate of p-cresol and dicyclopentadiene (Wingstay L, ELIOKEM) and a reaction product of 4-methylphenol and dicyclopentadiene (Lowinox CPL, Chemtura Corporation). With respect to the surfactant to be used in the antioxidant dispersion, a known anionic surfactant, nonionic surfactant, hydrated magnesium aluminum silicate, or the like may be appropriately used.

The antioxidant dispersion may be prepared by a known method; for example, it may be prepared using a ball mill, high-speed shearing stirrer, homogenizer, or the like.

The amount of the antioxidant may be appropriately adjusted. The lower limit thereof is preferably 0.1 parts by mass or more, more preferably 0.2 parts by mass or more, and further preferably 0.3 parts by mass or more, relative to 100 parts by mass of the rubber component in natural rubber latex, while the upper limit thereof is preferably 5 parts by mass or less, more preferably 3 parts by mass or less, and further preferably 2 parts by mass or less. Also, the amount of the surfactant may be appropriately adjusted. It is preferably 1 to 20 parts by mass relative to 100 parts by mass of the antioxidant to be added.

(Step 2)

In Step 2, the saponified natural rubber latex obtained in Step 1 is coagulated and the coagulated rubber is treated with a basic compound. As a result, proteins and the like components strongly attached to the coagulated rubber can be sufficiently removed, and therefore good fuel economy can be achieved.

Examples of the coagulation method in Step 2 include a method in which an acid such as formic acid, acetic acid, or sulfuric acid is added to adjust the pH, and a polymer coagulant may be added if necessary. As a result of the coagulation, not a large coagulation lump but a particulate rubber with a diameter of a few millimeters to 20 mm is formed, and proteins and the like components are sufficiently removed by the treatment with a basic compound. The pH is adjusted within the range of preferably 3.0 to 5.0, and more preferably 3.5 to 4.5.

Examples of the polymer coagulant include cationic polymer coagulants such as poly(dimethylaminoethyl (meth) acrylate methyl chloride quaternary salt); anionic polymer coagulants such as poly(acrylate salt); nonionic polymer coagulants such as polyacrylamide; and amphoteric polymer coagulants such as a copolymer of a dimethylaminoethyl (meth)acrylate methyl chloride quaternary salt and an acrylate salt. The amount of the polymer coagulant may be appropriately adjusted.

Then, the coagulated rubber obtained is treated with a basic compound. The basic compound is not particularly limited. Preferable is a basic inorganic compound due to its ability to remove proteins and the like components.

Examples of the basic inorganic compound include: metal hydroxides such as alkaline metal hydroxides and alkaline earth metal hydroxides; metal carbonates such as alkaline metal carbonates and alkaline earth metal carbonates; metal hydrogen carbonates such as alkaline metal hydrogen carbonates; metal phosphates such as alkaline metal phosphates; metal acetates such as alkaline metal acetates; metal hydrides such as alkaline metal hydrides; and ammonia.

Examples of the alkaline metal hydroxides include lithium hydroxide, sodium hydroxide, and potassium hydroxide. Examples of the alkaline earth metal hydroxides include magnesium hydroxide, calcium hydroxide, and barium hydroxide. Examples of the alkaline metal carbonates include lithium carbonate, sodium carbonate, and potassium carbonate. Examples of the alkaline earth metal carbonates include magnesium carbonate, calcium carbonate, and barium carbonate. Examples of the alkaline metal hydrogen carbonates include lithium hydrogen carbonate, sodium hydrogen carbonate, and potassium hydrogen carbonate. Examples of the alkaline metal phosphates include sodium phosphate and sodium hydrogen phosphate. Examples of the alkaline metal acetates include sodium acetate and potassium acetate.

Examples of the alkaline metal hydrides include sodium hydride and potassium hydride.

In particular, metal hydroxides, metal carbonates, metal hydrogen carbonates, metal phosphates, and ammonia are preferable; alkaline metal carbonates, alkaline metal hydrogen carbonates, and ammonia are more preferable; and sodium carbonate and sodium hydrogen carbonate are further preferable. Each of the basic compounds may be used alone, or two or more of these may be used in combination.

The method of treating the coagulated rubber with a basic compound is not particularly limited as long as the coagulated rubber is made in contact with the basic compound. Examples thereof include a method in which the coagulated rubber is immersed in an aqueous solution of a basic compound; and a method in which an aqueous solution of a basic compound is sprayed onto the coagulated rubber. The aqueous solution of a basic compound can be prepared by diluting and dissolving a basic compound with water.

The amount of the basic compound is preferably 0.1% by mass or more, and more preferably 0.3% by mass or more, based on 100% by mass of the aqueous solution. If the amount is less than 0.1% by mass, proteins may not be sufficiently removed. The amount is preferably 10% by mass or less, and more preferably 5% by mass or less. If the amount is more than 10% by mass, in spite of a large amount of the basic compound required, the amount of decomposed proteins does not increase, so that the efficiency tends to be poor.

The treatment temperature may be appropriately adjusted, and it is preferably 10° C. to 50° C., and more preferably 15° C. to 35° C. The treatment duration is usually 1 minute or longer, preferably 10 minutes or longer, and more preferably 30 minutes or longer. If the duration is shorter than 1 minute, the effects of the present invention may not be achieved well. The upper limit is not restricted; from the viewpoint of productivity, it is preferably 48 hours or shorter, more preferably 24 hours or shorter, and further preferably 16 hours or shorter.

After the treatment with a basic compound is performed and the compound used is removed, washing may be performed if necessary. Washing may be performed by for example, a method in which the rubber component is diluted with water, washed, and then separated by centrifugation, or a method in which, after such a washing, the rubber component is allowed to float in water by standing still, and then separated out by draining only the water phase.

A basic compound such as sodium hydroxide is used upon the saponification in Step 1 and a basic compound is again used in Step 2, but the actions of these compounds are different from each other. Specifically, the basic compound used upon the saponification adjusts the pH, and the nitrogen content in the coagulated rubber is not greatly changed even if the amount of the compound increases. This is presumably because proteins separated out by the saponification exist as substances with reduced molecular weights or as amino acids, and they adsorb on the rubber or maintain interactions with the rubber. On the other hand, the basic compound used in Step 2 removes remaining proteins, amino acids, and the like components attached to the rubber.

(Step 3)

After the treatment with a basic compound, the resulting coagulated rubber is treated with an acidic compound. The heat-aging resistance of the rubber tends to decrease due to the treatment with the basic compound in Step 2, but further treatment with an acidic compound prevents such a problem and leads to good heat-aging resistance.

The acidic compound is not particularly limited. Examples thereof include: inorganic acids such as hydrochloric acid, nitric acid, sulfuric acid, phosphoric acid, polyphosphoric acid, metaphosphoric acid, boric acid, boronic acid, sulfanilic acid, and sulfamic acid; and organic acids such as formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, methanesulfonic acid, itaconic acid, benzenesulfonic acid, toluenesulfonic acid, naphthalenedisulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, hydroxybenzenesulfonic acid, toluenesulfinic acid, benzenesulfinic acid, $\alpha$-resorcylic acid, $\beta$-resorcylic acid, $\gamma$-resorcylic acid, gallic acid, sulfosalicylic acid, ascorbic acid, erythorbic acid, and bisphenolic acids. Particularly preferable are acetic acid, sulfuric acid, formic acid, and the like. Each of the acidic compounds may be used alone, or two or more of these may be used in combination.

The method of treating the coagulated rubber with acid is not particularly limited as long as the coagulated rubber is made in contact with the acidic compound. Examples thereof include a method in which the coagulated rubber is immersed in an aqueous solution of an acidic compound; and a method in which an aqueous solution of an acidic compound is sprayed onto the coagulated rubber. The aqueous solution of an acidic compound can be prepared by diluting and dissolving an acidic compound with water.

The amount of the acidic compound in 100% by mass of the aqueous solution is not particularly limited. The lower limit thereof is preferably 0.1% by mass or more, and more preferably 0.3% by mass or more, while the upper limit is preferably 15% by mass or less, more preferably 10% by mass or less, and further preferably 5% by mass or less. If the amount is within the above range, good heat-aging resistance is achieved.

The treatment temperature may be appropriately adjusted, and it is preferably 10° C. to 50° C., and more preferably 15° C. to 35° C. In general, the treatment duration is preferably 3 seconds or longer, more preferably 10 seconds or longer, and further preferably 30 seconds or longer. If the duration is shorter than 3 seconds, neutralization may be insufficient and the effects of the present invention may not be achieved well. The upper limit thereof is not restricted; from the viewpoint of productivity, it is preferably 24 hours or shorter, more preferably 10 hours or shorter, and further preferably 5 hours or shorter.

In the treatment such as by immersing the rubber into an aqueous solution of an acidic compound, the pH is preferably adjusted to 6 or lower. Such neutralization results in excellent heat-aging resistance. The upper limit of the pH is more preferably 5 or lower, and further preferably 4.5 or lower. The lower limit thereof is not particularly limited; it is preferably 2 or higher, and more preferably 3 or higher because too strong an acid causes problems such as degradation of the rubber and troublesome wastewater disposal.

After the treatment with an acidic compound is performed and the compound used is removed, the resulting coagulated rubber after the treatment is washed. Washing may be performed by the same method as mentioned above, and may be repeated so as to achieve a desired phosphorus content and nitrogen content. After the washing, the rubber was dried, and thereby the modified natural rubber of the present invention is obtained.

The phosphorus content in the modified natural rubber (HPNR) obtained by the aforementioned production method or the like is preferably 200 ppm or less, and more preferably 150 ppm or less. If the content is more than 200 ppm, tan δ tends to be high, so that the fuel economy may not be improved.

The modified natural rubber preferably has a nitrogen content of 0.15% by mass or less, and more preferably 0.1% by mass or less, after immersed in acetone at room temperature (25° C.) for 48 hours. If the content is more than 0.15% by mass, the fuel economy may not be sufficiently improved. The nitrogen content means a value measured after the antioxidant in the rubber is removed by acetone extraction.

The phosphorus content and nitrogen content can be measured by the methods mentioned in the following examples.

The modified natural rubber usually has a weight average molecular weight (Mw) retention after aged for 72 hours at 80° C. (Mw retention=molecular weight after aging/molecular weight before aging×100) of 40% or higher. The retention is preferably 50% or higher, and more preferably 55% or higher.

The weight average molecular weight (Mw) retention can be measured by the method mentioned in the following examples.

[Tire Rubber Composition]

The tire rubber composition of the present invention comprises a rubber component, and carbon black and/or a white filler, and the rubber component includes a predetermined amount of the modified natural rubber.

In the rubber composition of the present invention, the amount of the modified natural rubber is 5% by mass or more, preferably 50% by mass or more, and more preferably 80% by mass or more, based on 100% by mass of the rubber component. If the amount is less than 5% by mass, excellent fuel economy may not be achieved.

Examples of rubbers to be used as the rubber component in addition to the modified natural rubber include natural rubber (non-modified) (NR), isoprene rubber (IR), butadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR).

The rubber composition of the present invention comprises carbon black and/or a white filler. This leads to reinforcement.

The carbon black preferably has a nitrogen adsorption specific surface area ($N_2SA$) of 70 $m^2/g$ or larger, and more preferably 100 $m^2/g$ or larger. If the $N_2SA$ is smaller than 70 $m^2/g$, sufficient reinforcement tends not to be achieved. The $N_2SA$ of the carbon black is preferably 200 $m^2/g$ or smaller, and more preferably 180 $m^2/g$ or smaller. If the $N_2SA$ is larger than 200 $m^2/g$, the fuel economy tends to be poor.

The nitrogen adsorption specific surface area of carbon black can be determined by the method A in accordance with JIS K 6217.

Examples of the white filler include those generally used in the rubber industry, for example, silica, calcium carbonate, mica such as sericite, aluminum hydroxide, magnesium oxide, magnesium hydroxide, clay, talc, alumina, and titanium oxide.

The amount of the carbon black is preferably 10 parts by mass or more, and more preferably 30 parts by mass or more, relative to 100 parts by mass of the rubber component. The amount is preferably 150 parts by mass or less, and more preferably 100 parts by mass or less. If the amount is within the above range, good fuel economy can be achieved.

In the rubber composition of the present invention, the total amount of the carbon black and the white filler is preferably 10 parts by mass or more, and more preferably 30 parts by mass or more, relative to 100 parts by mass of the rubber component. The total amount is preferably 150 parts by mass or less, and more preferably 100 parts by mass or less. If the total amount is within the above range, good fuel economy can be achieved.

In addition to the above materials, the rubber composition of the present invention may contain various materials usually used in the rubber industry, such as zinc oxide, stearic acid, an antioxidant of various types, sulfur, and a vulcanization accelerator, as appropriate.

The method for producing the rubber composition of the present invention may be a known method. For example, the composition may be produced by a method in which the components are kneaded using a rubber-kneading device such as an open roll mill or a Banbury mixer, and the kneaded mixture is then vulcanized. The rubber composition can be used for various tire components; in particular, the composition is suitably used for treads, sidewalls, breakers, and carcasses.

The pneumatic tire of the present invention is produced using the rubber composition by a usual method. Specifically, a rubber composition formed by mixing various materials as appropriate is extruded and processed into a shape corresponding to the shape of a tire component such as tread before vulcanization; the extrudate is molded on a tire building machine by a usual method to form an unvulcanized tire; and then the unvulcanized tire is heated and pressurized in a vulcanizer so that a pneumatic tire is produced.

EXAMPLES

The present invention will be described in detail based on examples; the present invention is not limited to these examples.

The chemicals used in the examples will be listed below.

Field latex: field latex (Muhibbah)

EMAL E-27C (surfactant): EMAL E-27C (Kao Corporation, sodium polyoxyethylene lauryl ether sulfate)

NaOH: NaOH (Wako Pure Chemical Industries, Ltd.)

Wingstay L (antioxidant): Wingstay L (ELIOKEM, compound obtained by butylating a condensate of ρ-cresol and dicyclopentadiene)

EMULVIN W (surfactant): EMULVIN W (LANXESS, aromatic polyglycol ether)

Tamol NN 9104 (surfactant): Tamol NN 9104 (BASF, sodium salt of naphthalenesulfonic acid/formaldehyde)

Van gel B (surfactant): Van gel B (Vanderbilt, hydrated magnesium aluminum silicate)

TSR: NR (TSR)

Carbon black: DIABLACK I (ISAF class) (Mitsubishi Chemical Corporation, $N_2SA$: 114 $m^2/g$)

Zinc oxide: zinc oxide #2 (Mitsui Mining & Smelting Co., Ltd.)

Stearic acid: Tsubaki stearic acid beads (NOF Corporation)

Antioxidant 6C: Nocrac 6C (Ouchi Shinko Chemical Industrial Co., Ltd., N-phenyl-N'-(1,3-dimethylbutyl)-p-phenylenediamine) (6PPD)

Insoluble sulfur: Seimi Sulfur (Nippon Kanryu Industry Co., Ltd., oil content: 10%)

Vulcanization accelerator TBBS (NS): NOCCELER NS (Ouchi Shinko Chemical Industrial Co., Ltd.)

EXAMPLES AND COMPARATIVE EXAMPLES

Preparation of Antioxidant Dispersion

Water (462.5 g) was mixed with EMULVIN W (12.5 g), Tamol NN 9104 (12.5 g), Van gel B (12.5 g), and Wingstay L (500 g) (total amount of mixture: 1000 g) for 16 hours using a ball mill, and thereby an antioxidant dispersion was prepared.

Example 1

The solids concentration (DRC) of field latex was adjusted to 30% (w/v). The latex (1000 g) was mixed with a 10% aqueous solution of EMAL E-27C (25 g) and a 25% aqueous solution of NaOH (60 g), and the mixture was saponified for 24 hours at room temperature. Thereby, a saponified natural rubber latex was obtained. Next, the antioxidant dispersion (6 g) was added and stirred for 2 hours, and water was further added in order to dilute the mixture to the extent that the rubber concentration was 15% (w/v). Then, formic acid was added under slow stirring so that the pH was adjusted to 4.0. A cationic polymer coagulant was added and the mixture was stirred for 2 minutes, so that coagulation occurred. The thus obtained coagulum (coagulated rubber) had a diameter of about 3 to 15 mm. The obtained coagulum was taken out and immersed in a 2% by mass aqueous solution of sodium carbonate (1000 ml) for 4 hours at room temperature. Then, the rubber was taken out. Water (1000 ml) was added thereto and the mixture was stirred for 2 minutes, and then operation of removing water as much as possible was repeated twice. Thereafter, water (500 ml) was added and 2% by mass formic acid was added so that the pH reached 4, and then the mixture was stirred for 15 minutes. Then, an operation cycle consisting of removing water as much as possible, adding water again, and stirring the mixture for 2 minutes was repeated 3 times, and the resulting rubber was dried for 4 hours at 90° C. Thereby, a solid rubber was obtained.

Example 2

A coagulated rubber obtained under the same conditions as in Example 1 was immersed in a 2% by mass aqueous solution of sodium carbonate (1000 ml) for 4 hours at room temperature and then the rubber was taken out. The rubber taken out was mixed with 2% by mass formic acid so that the pH reached 4, and then the mixture was stirred for 5 minutes. Thereafter, an operation cycle consisting of removing water as much as possible, adding water, and stirring the mixture for 2 minutes was repeated 5 times, and then the rubber was dried for 14 hours at 70° C. Thereby, a solid rubber was obtained.

Example 3

A coagulated rubber obtained under the same conditions as in Example 1 was immersed in a 2% by mass aqueous solution of ammonia (1000 ml) for 2 hours at room temperature. Then, the rubber was taken out and washed with water (1000 ml) twice. Water (500 ml) was then added, and 2% by mass formic acid was added so that the pH reached 4, and then the mixture was stirred for 15 minutes. Thereafter, an operation cycle consisting of removing water as much as possible, adding water again, and stirring the mixture for 2 minutes was repeated 3 times, and the resulting rubber was dried for 4 hours at 90° C. Thereby, a solid rubber was obtained.

Example 4

A coagulated rubber obtained under the same conditions as in Example 1 was immersed in a 2% by mass aqueous solution of sodium carbonate (1000 ml) for 2 hours at room temperature, and the rubber was taken out. The rubber taken out was washed with water (1000 ml) twice. Water (500 ml) was then added, and 10% by mass acetic acid was added so that the pH reached 3.5, and then the mixture was stirred for 15 minutes. Thereafter, an operation cycle consisting of removing water as much as possible, adding water again, and stirring the mixture for 2 minutes was repeated 3 times, and then the resulting rubber was dried for 4 hours at 90° C. Thereby, a solid rubber was obtained.

Example 5

A coagulated rubber obtained under the same conditions as in Example 1 was immersed in a 2% by mass aqueous solution of sodium carbonate (1000 ml) for 2 hours at room temperature, and then the rubber was taken out. The rubber taken out was washed with water (1000 ml) twice. Water (500 ml) was then added, and 0.5% by mass sulfuric acid was added so that the pH reached 4.5, and then the mixture was stirred for 15 minutes. Thereafter, an operation cycle consisting of removing water as much as possible, adding water, and stirring the mixture for 2 minutes was repeated 3 times, and then the resulting rubber was dried for 4 hours at 90° C. Thereby, a solid rubber was obtained.

Comparative Example 1

Except that no formic acid was added, a solid rubber was obtained under the same conditions as in Example 1.

Comparative Example 2

Except that no aqueous solution of sodium carbonate and no formic acid were added, a solid rubber was obtained under the same conditions as in Example 1.

Comparative Example 3

The solids concentration (DRC) of field latex was adjusted to 15% (w/v). Formic acid was added under slow stirring so that the pH was adjusted to 4.0, and then coagulation occurred. The coagulated rubber obtained was passed through a creping device several times while being washed with water, and thereby a thin rubber sheet was obtained. This rubber sheet was dried for 4 hours at 90° C. in an oven. Thereby, a solid rubber was obtained.

Comparative Example 4

A coagulated rubber obtained under the same conditions as in Example 1 was immersed in a 0.5% by mass aqueous solution of sodium chloride for 8 hours. The rubber was taken out, and washed with water (1000 ml) twice. Thereafter, 2% formic acid (500 ml) and water (500 ml) were added, and the mixture was stirred for 15 minutes. Washing with water (1000 ml) was further repeated 3 times, and the resulting rubber was dried for 4 hours at 90° C. Thereby, a solid rubber was obtained.

Comparative Example 5

TSR was used as a solid rubber in Comparative Example 5.

The solid rubbers obtained in Examples 1 to 5 and Comparative Examples 1 to 5 were evaluated as follows. Table 1 shows the results.

<Measurement of Nitrogen Content>
(Acetone Extraction (Preparation of Test Piece))

The solid rubbers were finely cut into 1-mm-square samples. About 0.5 g of each sample was weighed and immersed in acetone (50 g) for 48 hours at room temperature (25° C.). Then, the rubber was taken out and dried. Thereby, the respective test pieces (after extraction of antioxidant) were obtained.

(Measurement)

The nitrogen content of each of the obtained test pieces was measured by the following method.

Each of the acetone-extracted test pieces obtained above was decomposed and gasified using a trace nitrogen/carbon measurement device "SUMIGRAPH NC 95A (Sumika Chemical Analysis Service, Ltd.)", and the gas was analyzed using a gas chromatograph "GC-8A (Shimadzu Corporation)". Thereby, the nitrogen content was measured.

<Measurement of Phosphorus Content>

The phosphorus content was measured using an ICP optical emission spectrometer (P-4010, Hitachi, Ltd.).

<Heat-Aging Resistance>

The weight average molecular weights of each of the solid rubbers before and after aging were measured, and the heat-aging resistance was determined. The aging treatment was performed by finely cutting the rubber into 2- to 5-mm-squares and storing it in an oven at 80° C. for 72 hours. The weight average molecular weight was measured using a gel permeation chromatograph with poly-isoprene standards.

The heat-aging resistance was represented as a molecular weight retention (molecular weight after aging/molecular weight before aging×100) (%). A larger value indicates better heat-aging resistance.

TABLE 1

| | | (Solid rubber) | | | | | | | | | |
|---|---|---|---|---|---|---|---|---|---|---|---|
| | | Examples | | | | | Comparative Examples | | | | |
| | | 1 | 2 | 3 | 4 | 5 | 1 | 2 | 3 | 4 | 5 |
| Treatment | Saponification | Performed | Performed | Performed | Performed | Performed | Performed | Performed | Not performed | Performed | — |
| | Acid coagulation | Performed | Performed | Performed | Performed | Performed | Performed | Performed | Performed | Performed | — |
| | Basic compound | Sodium carbonate | Sodium carbonate | Ammonia | Sodium carbonate | Sodium carbonate | Sodium carbonate | Not performed | Not performed | Not performed (Sodium chloride) | — |
| | Acidic compound | Formic acid | Formic acid | Formic acid | Acetic acid | Sulfuric acid | Not performed | Not performed | Not performed | Formic acid | — |
| Remarks | | — | — | Water washing not performed after treatment with sodium carbonate | — | — | — | — | — | — | TSR |
| Evaluation | Nitrogen content (% by mass) | 0.08 | 0.09 | 0.08 | 0.10 | 0.09 | 0.08 | 0.22 | 0.36 | 0.25 | 0.37 |
| | Phosphorus content (ppm) | 89 | 90 | 92 | 88 | 92 | 90 | 88 | 452 | 95 | 486 |
| | Heat-aging resistance (%) | 60 | 61 | 61 | 62 | 60 | 18 | 60 | 58 | 57 | 62 |

Table 1 shows that in Comparative Example 1 in which only the treatment with a basic compound was performed, the nitrogen content was lower but the heat-aging resistance was poorer in comparison with Comparative Example 2 in which neither the treatment with a basic compound nor the treatment with an acidic compound was performed. In contrast, in Examples in which the treatment with an acidic compound was additionally performed, the heat-aging resistance was maintained at the same level as in Comparative Example 2.

With respect to the molecular weight after aging, the Mw was about 200,000 to 300,000 in Comparative Example 1 in which the treatment with a basic compound was performed, while the Mw was about 600,000 to 700,000, which is substantially the same level as that obtained with TSR, in Examples in which the treatment with an acidic compound was additionally performed. Further, the appearances were greatly different between the product in Comparative Example 1 and those in Examples. The product of Comparative Example 1 turned relatively dark brown, was not able to keep the cut-out shape and was turning into a syrupy form. In contrast, the product of each of Examples had relatively yellowish appearance and kept its shape; thus, the products of Examples were apparently less deteriorated.

Examples 6 to 10 and Comparative Examples 6 to 10

Preparation of Rubber Test Piece

Based on the compositions shown in Table 2, the chemicals other than the sulfur and vulcanization accelerator were kneaded using a 1.7-L Banbury mixer. Next, the sulfur and the vulcanization accelerator were kneaded with the obtained kneaded mixture using a roll, and thereby an unvulcanized rubber composition was obtained. A portion of the obtained unvulcanized rubber composition was press-vulcanized for 12 minutes at 150° C., and thereby a vulcanized product was obtained.

The unvulcanized rubber compositions and the vulcanized products obtained were evaluated as follows. Table 2 shows the results.

<T10: Scorch Time>

The time until the torque increased by 10 points at 130° C. was determined as T10 (scorch time (minutes)) using a Mooney viscometer (Shimadzu Corporation). The sample (unvulcanized rubber composition) was pre-heated for 1 minute before the measurement. A greater T10 value indicates that premature vulcanization is less likely to occur.

<T95: Optimum Curing Time>

The curing curve at 150° C. was obtained using Curelastometer 7 (JSR Trading Co., Ltd.). In accordance with a usual method, the time until the torque value reached 95% of the difference between the maximum torque and the minimum torque (minimum torque+(maximum torque−minimum torque)×0.95) was determined as T95 (optimum curing time (minutes)). A smaller T95 value indicates a faster curing rate.

<Rolling Resistance>

The loss tangent (tan δ) of each composition (vulcanized product) was measured using a viscoelasticity spectrometer VES (Iwamoto Seisakusho) under the following conditions: temperature of 70° C., initial strain of 10%, dynamic strain of 1%, and frequency of 10 Hz. The rolling resistance index of Comparative Example 8 was regarded as 100, and the index value of each composition was calculated based on the following formula. A smaller rolling resistance index indicates that the rolling resistance is lower, and thus preferable.

(Rolling resistance index)=(tan δ of each composition)/(tan δ of Comparative Example 8)×100

TABLE 2

| | | | (Rubber composition) | | | | | | | | | |
|---|---|---|---|---|---|---|---|---|---|---|---|---|
| | | | Examples | | | | | Comparative Examples | | | | |
| | | | 6 | 7 | 8 | 9 | 10 | 6 | 7 | 8 | 9 | 10 |
| Composition (parts by mass) | Solid rubber (100 parts by mass) | | Rubber of Ex. 1 | Rubber of Ex. 2 | Rubber of Ex. 3 | Rubber of Ex. 4 | Rubber of Ex. 5 | Rubber of Comp. Ex. 1 | Rubber of Comp. Ex. 2 | Rubber of Comp. Ex. 3 | Rubber of Comp. Ex. 4 | Rubber of Comp. Ex. 5 |
| | Carbon black | | 50 | 50 | 50 | 50 | 50 | 50 | 50 | 50 | 50 | 50 |
| | Zinc oxide | | 3 | 3 | 3 | 3 | 3 | 3 | 3 | 3 | 3 | 3 |
| | Stearic acid | | 2 | 2 | 2 | 2 | 2 | 2 | 2 | 2 | 2 | 2 |
| | Antioxidant 6C | | 1.5 | 1.5 | 1.5 | 1.5 | 1.5 | 1.5 | 1.5 | 1.5 | 1.5 | 1.5 |
| | Insoluble sulfur | | 1.67 | 1.67 | 1.67 | 1.67 | 1.67 | 1.67 | 1.67 | 1.67 | 1.67 | 1.67 |
| | Vulcanization accelerator TBBS (NS) | | 1 | 1 | 1 | 1 | 1 | 1 | 1 | 1 | 1 | 1 |
| Evaluation | Unvulcanized rubber composition | T10 (min) | 11.2 | 11.6 | 12 | 11.8 | 12.2 | 9.3 | 11.8 | 14.7 | 11.6 | 13.2 |
| | | T95 (min) | 9.2 | 9.5 | 9.4 | 9.7 | 10 | 6.6 | 9.9 | 10.3 | 10 | 9.5 |
| | Vulcanized rubber composition | Rolling resistance index | 88 | 90 | 91 | 89 | 90 | 89 | 95 | 100 | 94 | 102 |

Table 2 shows that in Examples 6 to 10 in which the solid rubbers of Examples 1 to 5 were used, the fuel economy was as good as in Comparative Example 6 in which the solid rubber of Comparative Example 1 with a reduced nitrogen content was used. Further, the heat-aging resistance was also excellent, and thus these performances were simultaneously achieved. On the other hand, in Comparative Examples 7 to 9 in which the solid rubbers with a greater nitrogen content were used, the fuel economy was poorer than in the Examples with the acid treatment.

The T95 in each of Examples 6 to 10 was longer than in Comparative Example 6 in which the solid rubber treated only with a basic compound was used, and it was similar to that in Comparative Example 10 with TSR, for example. The T10 in each of Examples 6 to 10 was longer than in Comparative Example 6. Therefore, the tests show that both the treatments with a basic compound and with an acidic compound enable prevention of rubber scorch.

The invention claimed is:

1. A method for producing a modified natural rubber, the method comprising:
   Step 1 in which a natural rubber latex is saponified;
   Step 2 in which the saponified natural rubber latex obtained in Step 1 is coagulated and the resulting coagulated rubber is treated with a basic compound; and
   Step 3 in which the treated rubber is treated with an acidic compound.

2. The method of claim 1, wherein the basic and acidic compounds are both in the form of aqueous solutions.

3. The method of claim 1, wherein the basic compound is a basic inorganic compound.

4. The method of claim 3, wherein the basic inorganic compound is at least one selected from the group consisting of metal hydroxides, metal carbonates, metal hydrogen carbonates, metal phosphates, and ammonia.

5. The method of claim 1, wherein the coagulated rubber is treated with the basic compound for 1 minute to 48 hours.

6. The method of claim 1, wherein the modified natural rubber has a nitrogen content of 0.15% by mass or less after immersed in acetone at room temperature for 48 hours.

7. The method of claim 1, wherein the modified natural rubber has a phosphorus content of 200 ppm or less.

8. A modified natural rubber obtained by treating a rubber coagulated from a saponified natural rubber latex, with a basic compound and then with an acidic compound, wherein the modified natural rubber has a weight average molecular weight retention, after aged for 72 hours at 80° C., of 40% or higher.

9. The modified natural rubber according to claim 8, wherein the modified natural rubber has a phosphorus content of 200 ppm or less.

* * * * *